US 8,141,152 B1

(12) United States Patent
Hwang et al.

(10) Patent No.: US 8,141,152 B1
(45) Date of Patent: Mar. 20, 2012

(54) METHOD TO DETECT SPAM OVER INTERNET TELEPHONY (SPIT)

(75) Inventors: Lin Yuh-Ing Hwang, Fremont, CA (US); Leroy Lacy, Morgan Hill, CA (US); Li Ling, Milpitas, CA (US)

(73) Assignee: Avaya Inc., Basking Ridge, NJ (US)

( * ) Notice: Subject to any disclaimer, the term of this patent is extended or adjusted under 35 U.S.C. 154(b) by 1126 days.

(21) Appl. No.: 11/958,729

(22) Filed: Dec. 18, 2007

(51) Int. Cl.
G06F 11/00 (2006.01)

(52) U.S. Cl. ............... 726/22; 726/15; 726/23; 726/24; 726/25; 713/150; 713/187; 713/188; 380/243; 380/247; 709/206; 379/88.08; 379/88.22; 370/242; 370/351; 704/246

(58) Field of Classification Search .................... 726/22, 726/15, 23, 24, 25; 379/88.19, 88.08, 88.22; 713/187, 188; 380/243, 247; 370/242, 351
See application file for complete search history.

(56) References Cited

U.S. PATENT DOCUMENTS

| | | | |
|---|---|---|---|
| 2005/0097121 A1* | 5/2005 | Sally et al. ............... | 707/102 |
| 2005/0259819 A1* | 11/2005 | Oomen et al. ............ | 380/200 |
| 2006/0013451 A1* | 1/2006 | Haitsma .................. | 382/124 |
| 2006/0036693 A1* | 2/2006 | Hulten et al. ............. | 709/206 |
| 2006/0059349 A1* | 3/2006 | Roberts .................. | 713/176 |
| 2007/0036314 A1* | 2/2007 | Kloberdans et al. ....... | 379/189 |
| 2007/0121596 A1* | 5/2007 | Kurapati et al. .......... | 370/356 |
| 2007/0124384 A1* | 5/2007 | Howell et al. ............ | 709/206 |
| 2007/0133757 A1* | 6/2007 | Girouard et al. .......... | 379/67.1 |
| 2007/0150276 A1* | 6/2007 | Srivastava et al. ........ | 704/246 |
| 2007/0168409 A1* | 7/2007 | Cheung ................... | 708/400 |
| 2008/0037776 A1* | 2/2008 | Akiyama et al. .......... | 380/44 |
| 2008/0123823 A1* | 5/2008 | Pirzada et al. ........... | 379/88.11 |
| 2009/0067410 A1* | 3/2009 | Sterman et al. ........... | 370/352 |
| 2010/0131270 A1* | 5/2010 | Charzinski .............. | 704/234 |
| 2010/0306820 A1* | 12/2010 | Battistello et al. ........ | 726/3 |
| 2011/0038478 A1* | 2/2011 | Akiyama et al. .......... | 380/44 |
| 2011/0072261 A1* | 3/2011 | Thomas et al. ........... | 713/156 |

FOREIGN PATENT DOCUMENTS

GB 2435978 A * 9/2007

OTHER PUBLICATIONS

Li et al., "TTSF: A Novel Two-Tier Spam Filter," Proceedings on the Seventh International Conference on Parallel and Distributed Computing, Applications and Technologies, 2006, 6 pages.

Juergen Quittek et al., "Prevention of Spam over IP Telephony (SPIT)," NEC Technical Journal, 2006, pp. 114-119, vol. 1, No. 2.

Jaap Haitsma et al., "Robust Audio Hashing for Content Identification," Philips Research, 8 pages, The Netherlands, 2004.

(Continued)

*Primary Examiner* — April Shan
(74) *Attorney, Agent, or Firm* — Sheridan Ross P.C.

(57) ABSTRACT

The present invention provides methods, devices, and systems for detecting and filtering SPam over Internet Telephony (SPIT). The invention includes a two level filter. The first level may include a robust audio hash used to filter audio messages based on their audio content and the second level may include a near-duplicate pattern matching algorithm having a number of content filters and an evaluator to aggregate the results from the multiple content filters. By supporting multiple aggregation methods, a more flexible SPIT detection scheme is provided.

17 Claims, 6 Drawing Sheets

OTHER PUBLICATIONS

J. Quittek et al., "On Spam over IP Telephony (SPIT) prevention," 9 pages, Germany, 2006.

Robert MacIntosh et al., "Detection and Mitigation of Spam in IP Telephony Networks using Signaling Protocol Analysis," IEEE/Sarnoff Symposium on Apr. 18-19, 2005, pp. 49-52.

George Tzanetakis et al., "Pitch Histograms in Audio and Symbolic Music Information Retrieval," Computer Science Department at Princeton University, 8 pages, USA, 2002.

Markus Hansen et al., "Developing a Legally Compliant Reachability Management System as a Countermeasure against SPIT," The Net Generation, 19 pages, 2006.

J. Rosenberg et al., "A Framework for Consent-Based Communications in the Session Initiation protocol (SIP)" Internet draft, Feb. 25, 2006, 22 pages.

J. Peterson et al., "Enhancements for Authenticated Identity Management in the Session Initiation Protocol (SIP)," Internet draft, Oct. 24, 2005, 38 pages.

J. Rosenberg et al., "The Session Initiation Protocol (SIP) and Spam," Internet draft, Feb. 26, 2007, 25 pages.

* cited by examiner

METHOD TO DETECT SPAM OVER INTERNET TELEPHONY (SPIT)

FIELD OF THE INVENTION

The invention relates generally to message analysis and more specifically to the detection of SPIT based on the content analysis of messages.

BACKGROUND

Spam is defined as the transmission of unsolicited electronic message and is considered one of the biggest problems with the Internet. Due to the electronic and anonymous nature of the Internet, entities can transmit thousands of emails to different recipients as a part of marketing certain goods and services, most of which are not wanted by the recipient. Most email users receive more spam emails than regular emails and may end up spending much of their time culling through the spam emails to read the regular emails. A primary reason spam is so prolific is because no solution were developed before the problem of spam arose. Accordingly, most solutions to the spam problem have been band-aid solutions that are one or more steps behind the spamming technology.

With the increasing deployment of Internet telephony, it is expected that a similar form of spam will arise. This SPam over Internet Telephony (SPIT) or Voice over IP (VoIP) spam is defined as the transmission of unsolicited calls over Internet telephony.

It is already possible for entities to transmit unsolicited calls over the traditional Public Switched Telephone Network (PSTN), where telemarketers typically initiate such calls. These unsolicited calls are limited, however, because of the relatively high cost of a PSTN call. The costs associated with using Internet telephony to place calls is substantially, lower than that associated with the PSTN since spam software is much easier to program for the Internet Protocol and a spammer can multiplex multiple calls on a single line. It has been reported that IP-based SPIT is roughly three times cheaper to send than traditional circuit-based telemarketing calls. The cost per spam call of IP-based SPIT is low and is essentially independent of the signaling protocol (e.g., SIP or H.323). These cost factors will undoubtedly increase the demand for SPIT in the future, especially as VoIP technology becomes more prevalent. Further factors which may influence the advancement of SPIT include the fact that it is easy to hide the source of SPIT, which adds difficulty in associating the SPIT call to an entity. This type of anonymity was not previously available with the PSTN calls. It is also quite easy to use unauthorized access and hijacked machines, such as zombie networks, to send SPIT for free.

Accordingly, there is a strong need for SPIT prevention systems that can anticipate and block SPIT messages. Traditional spam filtering techniques may be employed to block some types of SPIT, but these techniques cannot be fairly relied upon to stop any type of sophisticated SPIT. Most of the problems currently encountered by spam detection and management technologies will likely be faced by SPIT prevention technologies such as, false positives, false negatives, computational complexity, processing demands, and so on.

Current SPIT detection/prevention techniques focus mainly on the caller, caller authentication, statistical metrics like call rates, spacing between calls, and call duration. These techniques have their advantages and drawbacks. Content filtering of SPIT, on the other hand, has been largely neglected because of the difficulty of performing speech recognition for finding SPIT. Indeed, if a system tried to analyze speech content through traditional speech recognition/keyword detection (e.g., Bayesian spam filters) for SPIT problems, it would be easy for spammers to throw off speech recognition systems for the following reasons: (1) speech recognition is difficult and inaccurate if vocabulary size is large; (2) speech recognition can be altered by noise and channel, thus spammers can make calls with background noises to fool speech recognition systems; (3) different speakers with different accents or speaker-class characteristics can be used to fool content based analysis tools; and (4) a smart spammer might create certain random variations to pre-recorded audio by inserting music and/or silence to make the audio content of each message seem different while still being understandable for the end listener.

Therefore, it would be easy for spammers to make calls with background noises, poor grammar, varied accents, or add randomness to pre-recorded templates, all of which will throw off traditional recognition systems.

SUMMARY

These and other needs are addressed by various embodiments and configurations of the present invention. The present invention is directed generally to a system, device, and method for analyzing the content of messages, such as audio portions of a message, to determine whether the message is SPIT. In accordance with one embodiment, the method comprises:

receiving an electronic message addressed to an intended recipient;

extracting one or more feature vectors from content of the message;

comparing the extracted feature vector(s) to feature vectors from content of previously identified spam messages;

determining whether the extracted feature vector(s) is/are within a threshold distance from at least one spam feature vector; and performing one of the following:
  (i) in the event that the extracted feature vector(s) is/are within the threshold distance from one or more spam feature vector(s), adding the electronic message to a list of previously identified spam messages; and
  (ii) in the event that the extracted feature vector(s) is/are not within the threshold distance from one or more spam feature vector, allowing the electronic message to be forwarded to the intended recipient.

In addition to adding the electronic message to a list of previously identified spam messages, a distance threshold for the at least one feature vector may be determined if the new distance for that at least one feature vector becomes the smallest distance in the vector space.

A message feature is any type of element or characteristic of a message that may be extracted or otherwise isolated within a message. A message feature may also comprise a collection of message features. The message features may be represented numerically by message feature vectors that describe the message feature in a message feature space. Message feature vectors may comprise a scalar value or a function of some other variable (e.g., time, frequency, etc.). In embodiments where the message feature vector comprises a function, the function may be a continuous function or a discrete function.

One example of a message feature is the number of syllables in a message. The vector corresponding to this particular message feature may comprise a count (i.e., a scalar representation) of the number of syllables that actually exist in the message. Another example of a message feature is the time-dependent nature of the message's frequency. The vector corresponding to this particular message feature may comprise a continuous function showing the existence of certain frequencies in the message or a time-dependent representation of a certain frequency's amplitude.

In accordance with at least some embodiments of the present invention, a feature vector extracted from a message may represent the entire contents of the message or only selected portions of the message, depending upon the type of feature vector desired for analysis. Some feature vectors may be slight variants of the original message. For example, some feature vectors may describe the content of the message with noise removed therefrom. Alternatively, other feature vectors may be significant variants of the original message. An example of such a feature vector may comprise a description of the message with all noise above a certain frequency removed.

It is one aspect of the present invention to employ a plurality of content filters and thus extract a plurality of feature vectors that describe the content of the message in different ways and account for possible distortion and randomness addition to an audio spam template. Accordingly, the threshold distance associated with any particular feature vector may vary and be defined differently for each extracted feature vector. For example, if speech detection is applied to remove all forms of speech from the message, then the threshold may be defined based on the background music volume and characteristics (e.g., tone, pitch, etc.). Alternatively, if noise/music detection is applied to remove all contents of the message except for the speech, then the corresponding threshold may be defined based on the number of words or syllables in the message.

In addition to applying a near-duplicate matching of feature vectors, a digest module may also be used in accordance with embodiments of the present invention. The digest module may be adapted to create a digest of the incoming audio that robustly describes the content of the audio. As one example, a robust hash or series of hash values may be generated for the message based on the frequency characteristics of the message. The hash values may be compared to hash values of known spam messages (i.e., previously identified spam messages) to determine if the message is substantially similar to known spam. If, based on the comparison of hash values, the incoming message is determined to be spam, its hash values may be added to the spam database for future comparison to incoming messages.

In accordance with at least some embodiments of the present invention, a two-level filter may be employed to detect and effectively block spam and SPIT. The two-level filter may comprise the digest module on the first level and the near-duplicate matching module on the second level. The digest module may be applied to the messages first to determine if there are any known spam messages with very similar content. If the message makes it through the first level of filtration, the message may then be processed by the near-duplicate matching module which is adapted to account for purposefully embedded randomness in the content of the audio message, the likes of which could not be accounted for as well by the digest module. By applying a two-level filter, the quicker comparison can be made prior to applying the more computationally involved comparison.

In accordance with additional embodiments of the present invention, another level of filtration may be employed prior to applying the digest module or near-duplicate matching module. This pre-filtration may comprise traditional spam detection/removal technologies that are known in the art.

A "message" as used herein may include a real-time communication or a message saved on a storage medium, such as a recorder or voicemail server. A message may contain a media portion and a signaling portion, where the content of the message is contained in the media portion and the routing and description information of the message is contained in the signaling portion.

The phrases, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refer to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process' or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material". The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to detect unsolicited electronic messages.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth to provide a thorough understanding of the present invention. It should be appreciated, however, that the present invention may be practiced in a variety of ways beyond the specific details set forth herein.

Figure 1:
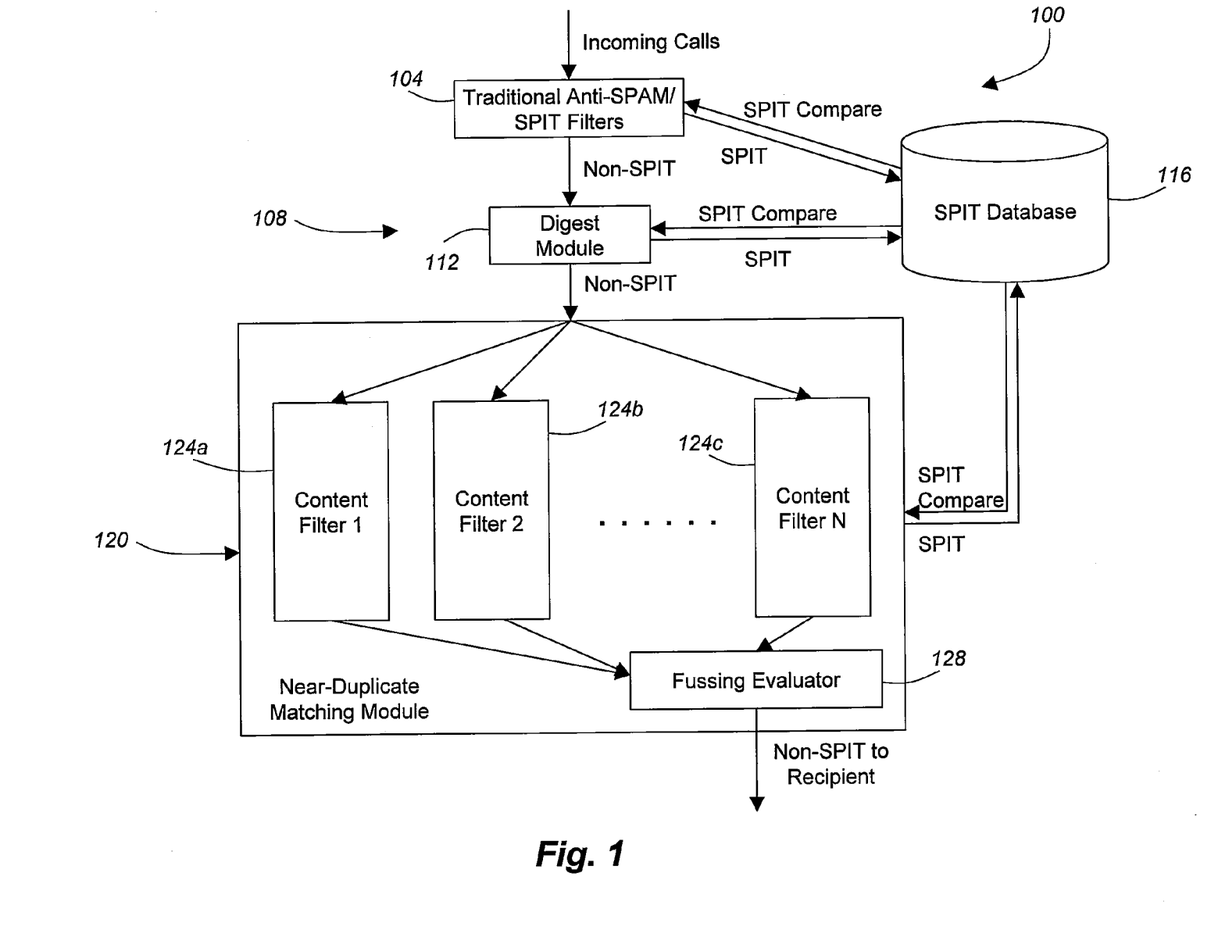
FIG. 1 is a block diagram depicting SPIT detection system in accordance with embodiments of the present invention.

FIG. 1 shows a SPIT detection and filtration system 100 in accordance with at least some embodiments of the present invention. The SPIT detection and filtration system 100 may comprise a number of different levels of SPIT filters such as a traditional anti-spam/SPIT filter 104, a first level of advanced SPIT filtration 108, and a second level of advanced SPIT filtration 120. Each level of the system 100 may analyze a particular incoming call and compare certain features of the call to features of previously identified spam and SPIT stored in a SPIT database 116.

The traditional anti-spam/SPIT filter 104 may employ any type of traditional spam prevention technology to stop incoming calls from being transmitted to or saved on a voicemail server for the identified recipient. Examples of technologies that may be employed by the traditional anti-spam/SPIT filter 104 includes, but are not limited to, lists (grey lists, white lists, and/or black lists), circles of trust, pattern/anomaly detection, computational puzzles, sender checks, Turing tests, consent-based communications, content filtering, reputation systems, limited-use addresses, payments at risk, and first-contact feedback. This traditional SPIT filter 104 may evaluate various properties of an incoming call, such as the caller identity, the call route, and so on to determine if the call is being solicited by a known or potential spammer. Such determinations may be made by comparing the incoming call to known spam and SPIT messages stored in the SPIT database 116. If a message is identified as SPIT, the traditional anti-spam/SPIT filter 104 may send the message to the SPIT database 116 where features of that particular message can be cataloged and used to identify future SPIT messages. The traditional SPIT filter 104 is not, however, generally capable of analyzing the content of the incoming message, specifically the media portion of the call, to determine if the message is SPIT.

The first level of advanced SPIT filtration 108, on the other hand, is capable of analyzing the content of the incoming message to determine if it is SPIT. The first level of advanced SPIT filtration 108 comprises a digest module 112 that is adapted to extract a limited number of bits from the audio content of the message and translate them into a bit string. In accordance with at least one embodiment of the present invention, the digest module 112 may create a sequence of audio hash values as a robust representation of the unique content of the voice portion of the message. When messages are received, the digest module 112 may create a digest of the body (e.g., media portion) of the message and compare it to the set of digest values of known SPIT from the SPIT database 116. If there is a substantial match, as determined by a matching threshold, then there is a high probability that the message is SPIT and the digest module 112 may identify the message as such. If the message is identified as SPIT, the digest algorithm may restrict the message from being forwarded to the intended recipient and may store the digest, of the message in the SPIT database for use in analyzing future messages.

If an incoming message passes the first level of filtering 108, the message may be passed to the second level SPIT filtration 120 where the content of the message, specifically the audio portion of the message, is analyzed utilizing non-exact audio similarity matching techniques. The second level SPIT filtration 120 may comprise a near-duplicate matching module containing a number of content filters 124a-N, each adapted to analyze the content of the message is a different way. The filters 124a-N may each be able to utilize robust audio similarity matching techniques to look for clues that the incoming audio portion of a message is SPIT. The filters 124a-N may employ very efficient near-duplicate detection techniques to find SPIT audios that are variations of other SPIT audios that were previously caught and indexed in the SPIT database 116. As noted above, the known SPIT audios may have been identified by traditional SPIT detection methods (e.g., reputation systems, black lists/white lists, etc.) as well as the advanced SPIT detection methods. The filters 124a-N operate on the assumption that a template message was used to create the received message but the template message was altered by the spammer via some slight message alteration mechanism (e.g., noise addition, silence addition, voice alterations, applying different compression algorithms, etc.).

The near-duplicate matching module 120 may further comprise a fussing evaluator 128 to aggregate and analyze the results from the multiple filters 124a-N. The fussing evaluator may be adapted to aggregate the results in a number of different ways. More specifically, different "fussing" methods may be employed that include "AND", "OR", and/or "VOTE." These fussing methods may be selectively employed by the fussing evaluator 128 to determine if a particular message has enough content similarity to message content of a known SPIT message. By supporting multiple aggregation methods, the near-duplicate matching module 120 can provide users with additional flexibility in defining how "close" the content of an incoming message has to be to the content of a known SPIT message before the incoming message is identified as SPIT. The near-duplicate matching module 120 may employ a plurality of content filters 124 and a fussing evaluator 128 to examine the voice content of the message in a number of different ways, whereas the prior art traditionally examined the signaling statistics and call patterns of messages to determine if it is SPIT.

In accordance with at least some embodiments of the present invention, the first content filter 124a may be adapted to remove some silence from the audio portion of the message to determine if the content of the message is similar or identical to the content of any known SPIT message based on the silence removed. The second content filter 124b may be adapted to apply an alternative compression algorithm to the message prior to comparing the content of the message to the content of known SPIT messages. Additional content filters 124 may also be employed to filter out high frequency noise, low frequency noise, or other sound in various frequency bandwidths. Multiple content filters 124 may be allowed to work together to increase the coverage of spam categories, improve the detection rate for each category, all while maintaining low false positive rates.

In accordance with at least some embodiments of the present invention, the system 100 may be designed for the non-real-time prevention of SPIT. This means that the filtering does not postpone or intervene incoming/ongoing phone conversations. Such an embodiment of the system 100 may be employed on voicemail servers, where the voice messages are stored and delivered to VoIP endpoints some time after they have been left. The system 100 would automatically filter audio messages stored on the server, delete and/or mark the messages as SPIT before the end user accesses his/her voice mailbox. The system 100 may also be employed in a HONEYPOT such that suspicious audio messages caught by more light-weight methods (e.g., signaling anomalies, protocol anomalies, etc.) will be directed to the HONEYPOT for further analysis. In the HONEYPOT, the content-based analysis may be performed by digest module 112 and/or near-duplicate matching module 120 to determine whether or not audio is "perceptually" similar to any known SPIT. Once found, further mitigation actions could be taken to stop propagation of SPIT through more mature tests (e.g., Turing tests, blacklists, rate limiting, etc.).

The system 100 may be alternatively employed in real-time SPIT prevention at an enterprise server or gateway when messages that are targeted toward a particular enterprise user enter the enterprise or domain associated with the enterprise user. Alternatively, a real-time embodiment of the system 100 may be employed on a user's endpoint (e.g., phone, personal computer, laptop, etc.). Of course, the system 100 may also be distributed throughout an enterprise. A real-time analysis of messages to determine if they are SPIT may require the system 100 to analyze different communication channels since signaling and media for a single message may be carried on two different channels. The system 100 may analyze the content of the data transmitted on the media channel while it employs more traditional spam filtering techniques on the signaling channel With reference now to FIG. 2, a more detailed depiction of the digest module 112 will be described in accordance with at least some embodiments of the present invention. A popular mechanism for digesting digital files is the MD5 and SHA1 hash. There are, of course, other very efficient digest algorithms that could be employed to create digests of potential SPIT messages. For example, pictograph digests of the sound may be generated using known audio-to-image conversions and the pictographs may be compared to pictographs of known SPIT to determine if they are substantially similar. Alternatively, histogram digests of the sound may be generated and compared to histograms of known SPIT. An article by Tzanetakis et al. entitled "Pitch Histograms in Audio and Symbolic Music Information Retrieval," the entire contents of which are hereby incorporated herein by this reference, describes an exemplary method of creating histograms to represent the pitch content of music signals both in symbolic and audio form.

A particular property of cryptographic hash functions is their extreme fragility to slight variances in data. For example, flipping a single bit in the source data will generally result in a completely different hash value being generated. This makes cryptographic hashing difficult for summarizing media data transmitted by VoIP for which it is required that different quality versions, through paths of different error rates, of the same content yield the same hash.

Accordingly, it may be desirable to employ a hash that is not as sensitive to slight variations in content. Hashes of multimedia content that are, to a certain extent, invariant to data processing (as long as the processing retains an acceptable quality of the content) are referred to as robust summaries, robust signatures, robust fingerprints, perceptual hashes, or robust hashes.

Figure 2:
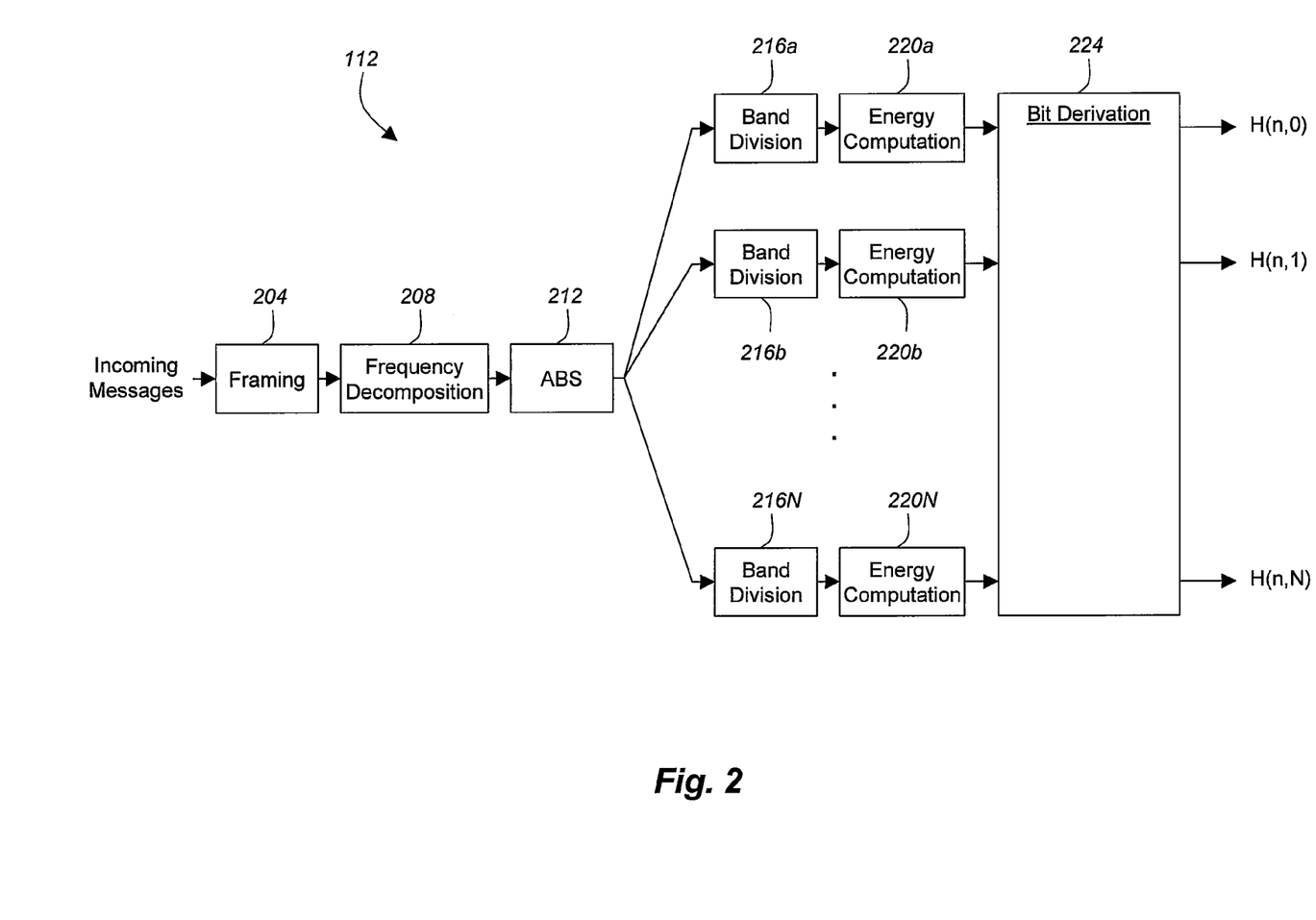
FIG. 2 is a block diagram depicting details of a robust audio hash in accordance with embodiments of the present invention.

The digest module 112 may comprise a number of elements that can extract robust features of an incoming message and translate the features into a bit string. A collection of the bit strings identifying various parts of the message is referred to as a robust hash. Content of the message can then be identified by comparing hash values of a received audio clip with the hash values of previously stored original audio clips of messages that were determined to be SPIT. One distinguishing feature of the proposed hash scheme is its ability to extract a bit string for every predetermined length of the message.

Messages that enter the digest module 112 may first be passed through a framing operation 204 that windows the media into basic windowed time intervals (i.e., frames). The frames may have a length ranging from about 0.2 seconds to about 0.6 seconds with a preferred length of about 0.4 seconds. The digest module 112 may further comprise a frequency decomposition operation 208 (such as a Fourier Transform or Fast Fourier Transform) and a normalizing operation 212 (such as an absolute value function) that transforms each frame from the time domain into the frequency domain then eliminates any part of the frequency spectrum that is less than zero.

The absolute value of the frames in the frequency domain may then be passed, in parallel, through a plurality of band division modules 216a-N, a plurality of energy computation modules 220a-N, and a bit derivation module 224. To extract a 32-bit hash value for every frame, the band division modules 216a-N may be used to select 33 non-overlapping frequency bands. The energy computation modules 220a-N may then be adapted to calculate the energy of the signal in the band and provide that data to the bit derivation module 224 where the 32-bit hash values H(n,0) through H(n,N), where N equals 32, are output. The hash values for each frame may then be compared to the hash values of known SPIT messages to determine if the content of the message is equal to the content of a message already identified as SPIT.

The digest module 112 advantageously enables users to extract robust content identifiers from an audio portion of a message, even if it has been modified within an acceptable range of degradation (e.g., by compression, Analog-to-Digital conversion, Digital-to-Analog conversion, or noise addition).

Additional details of operation of a robust hash algorithm similar to the one employed by the digest module 112 is described by Haitsma et al. in "Robust Audio Hashing for Content Identification," the entire contents of which are hereby incorporated herein by this reference.

Figure 3:
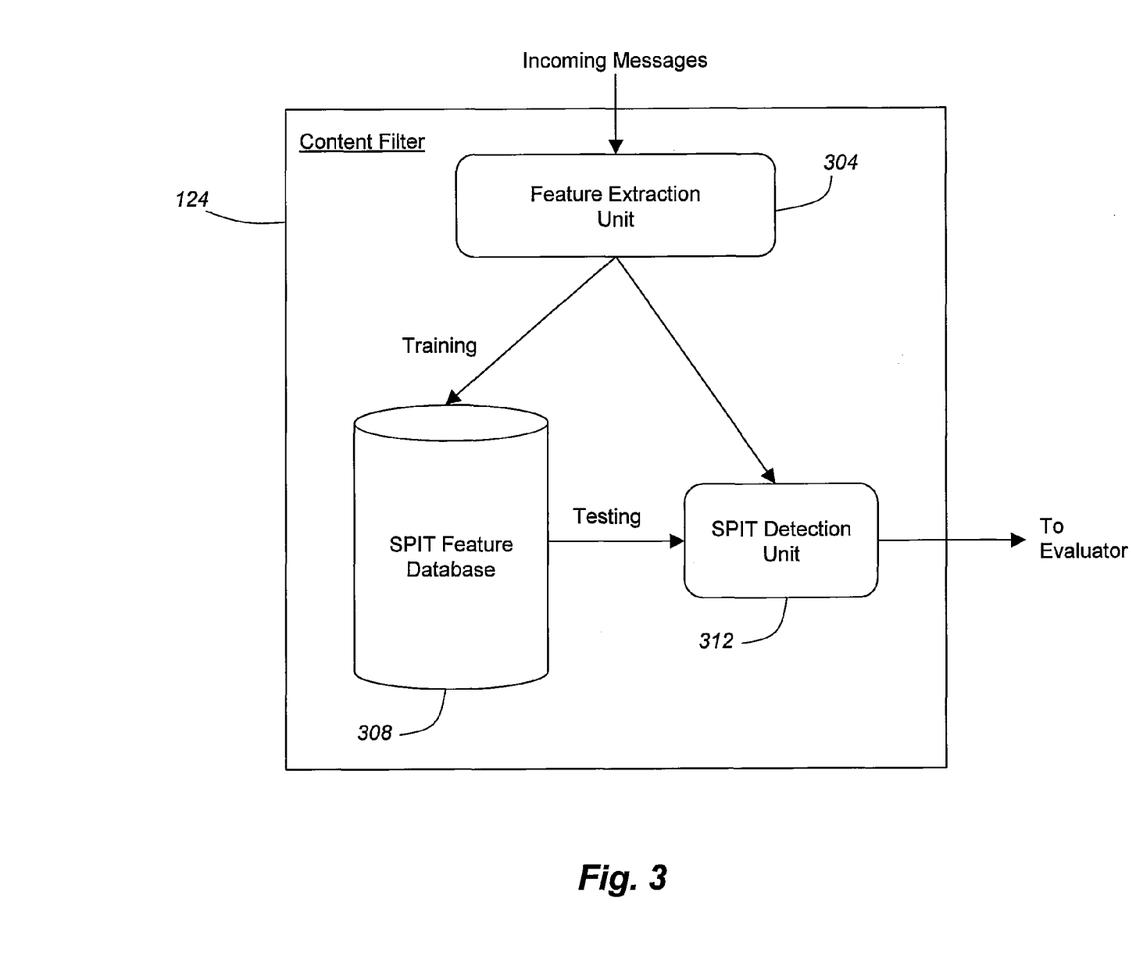
FIG. 3 is a block diagram depicting details of a content filter in accordance with embodiments of the present invention.

Referring now to FIG. 3, a content filter 124 will be described in further detail in accordance with at least some embodiments of the present invention. The content filter 124 may comprise a feature extraction unit 304, a SPIT feature database 308, and a SPIT detection unit 312. The feature extraction unit 304 of the content filter 124 may be adapted to extract certain features of process incoming audio in a particular way. For example, the feature extraction unit 304 of one content filter 124 may comprise a high frequency filter that only allows sound below a particular frequency to pass through for analysis, while the feature extraction unit 304 of another content filter 124 may comprise a low frequency filter that only passes higher frequency sound. Other feature extraction units 304 may be employed to perform at least one of the following signal processing techniques: bandpass filtration, silence removal, speech detection to remove background music/noise, application of various compression algorithms, and so on. The feature extraction units 304 of the content filters 124 are used to isolate and remove certain intentionally created random variations in messages that allowed the message to pass through the digest module 112 as non-SPIT. The use of different feature extraction units 304 on different content filters 124 allows the content filters 124 to each operate in a different feature vector space and analyze different features of the same audio message.

One issue of interest in designing the content filter 124 of the near-duplicate matching module 120 is to determine how "near" two audios need to be when compared to each other to conclude that the two audios are substantially similar. In other words, a distance threshold in the filter's 124 feature vector space of the audio messages needs to be determined. The distance threshold for each filter 124 may be different since each filter 124 operates in a different feature vector space. If a threshold is too small, then the filter 124 will tend to achieve low false positive rates, but low detection rates. If a threshold is too large, the filter 124 may tend to achieve high false positive rates, but high detection rates. Accordingly, a training stage may be employed to determine thresholds for each filter 124. During the training stage, threshold of smallest distance with each known SPIT will be derived by training with a SPIT dataset stored in the SPIT feature database 308. The SPIT feature database 308 stores known SPIT messages and their feature vectors corresponding to the features that are to be extracted by the feature extraction unit 304. The training step performed by cataloging the feature vector space for each known SPIT message essentially creates a high dimensional sphere in the feature space such that if any other feature vector of a new message falls into the sphere the entire message may be considered SPIT.

The SPIT detection unit 312 is the agent responsible for comparing the feature vectors of known SPIT messages with feature vectors extracted from incoming messages. If the SPIT detection unit 312 identifies that a particular incoming message has a feature vector within the known SPIT feature space, then the SPIT detection unit 312 identifies that message as having a feature within the SPIT space (e.g., by marking the message with a flag, where the flag comprises an identifier of the feature vector space that was evaluated by the content filter 124). The message is then forwarded to the fussing evaluator 128, along with the identification that the message may be SPIT, if applicable, where the fussing evaluator 128 can then combine the inputs receive from all content filters 124a-N to determine if enough feature vectors fell within the SPIT feature vector space to qualify the message as SPIT.

Figure 4:
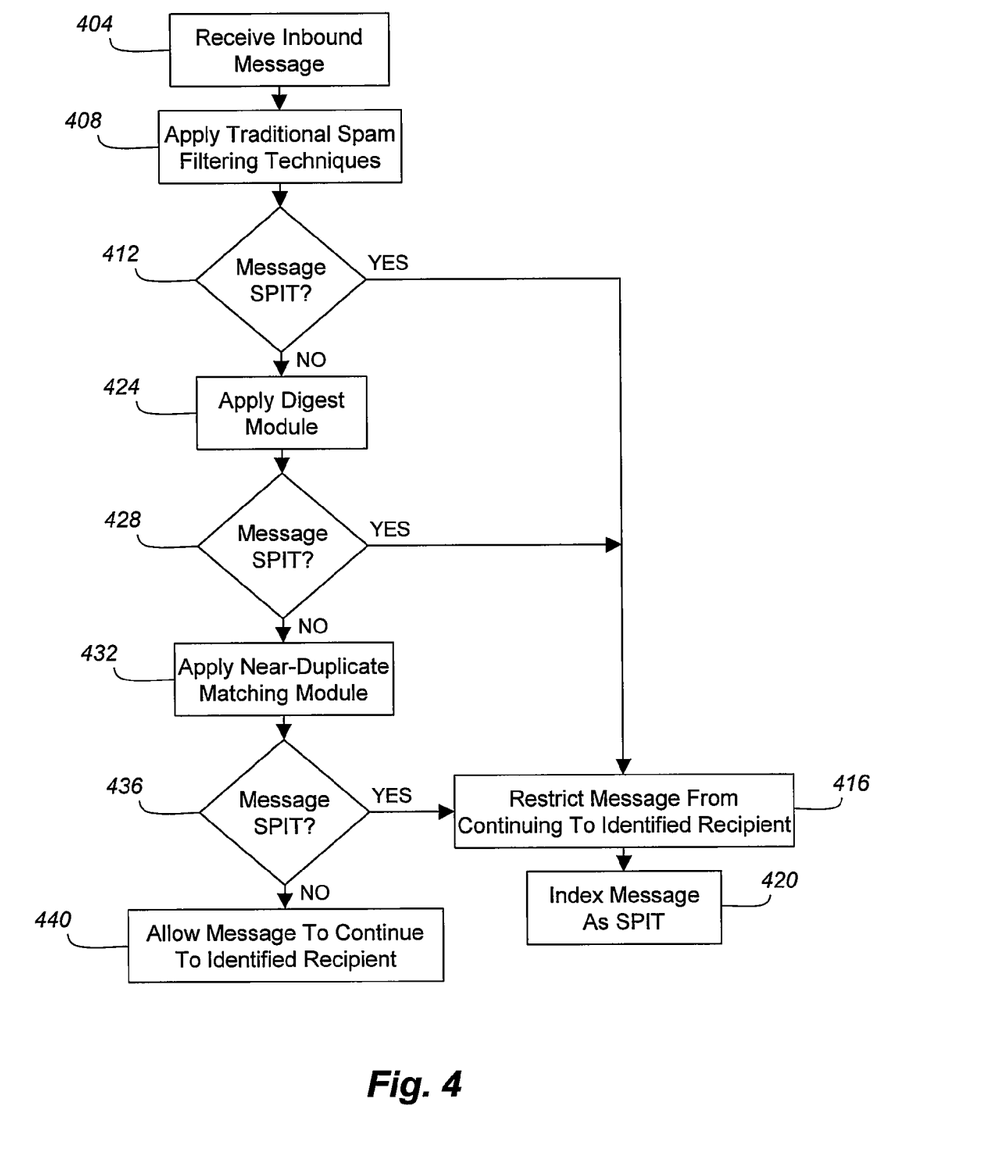
FIG. 4 is a flow diagram depicting a two-level method of detecting SPIT messages in accordance with embodiments of the present invention.

With reference now to FIG. 4, a two-level method of filtering messages for SPIT will be described in accordance with at least some embodiments of the present invention. The method is initiated when a new message is received at the SPIT detection and filtration system 100 (step 404). As noted above, the system 100 may reside on a server, a router, a gateway, an endpoint, and/or any other communication system element. Accordingly, the method is initiated when the message is received at the communication system element where the system 100, or at least part of it, resides.

Upon receiving the message traditional spam filtration techniques are applied to determine if the message is SPIT (step 408). In this step, the message is analyzed with traditional signaling and routing techniques. For example, the sender/sender's address of the message may be compared to senders of previously identified SPIT and spam. Other techniques that may be employed in this step include, but are not limited to, lists (grey lists, white lists, and/or black lists), circles of trust, pattern/anomaly detection, computational puzzles, sender checks, Turing tests, consent-based communications, content filtering, reputation systems, limited-use addresses, payments at risk, and/or first-contact feedback. In some embodiments of the present invention, the traditional spam filtering techniques may be applied to the signaling channel that is carrying the signals of the message.

Based on the application of the traditional spam filters, it is determined whether the message is SPIT (step 412). If the message is identified as SPIT, then the method continues by restricting the message from continuing to the identified recipient (step 416). This step may be executed by placing the message in a SPIT message box where the intended recipient can review it to ensure the message is SPIT. Alternatively, the message may be deleted such that the intended recipient is never bothered with the message. Other known mitigation actions may be taken against the source of the SPIT. The message may then be indexed as SPIT and its various features/characteristics may be stored in the various SPIT databases of the system 100 (e.g., SPIT database 116, SPIT feature database 308, etc.) (step 420). In this step, every message that is detected as SPIT or other types of spam (i.e., spam not traveling over Internet Telephony) will be used to update the SPIT database 116 as well as the SPIT feature database 308.

If traditional spam filtering techniques fail to identify the message as SPIT, the method continues by applying the digest module 112 to the message such that the content of the message is analyzed (step 424). During application of the digest module 112 a digest of the incoming message may be generated and compared to digests of known SPIT messages from the SPIT database 116. Examples of digests which may be created and used for comparison include robust hashes of the message, pictograms of the message, and histograms of the message. Alternatively, only portions of the message may be digested and compared to some or all of the known SPIT messages. The method continues by determining whether the message is, within some degree of certainty, classified as SPIT based on the comparison of its digest with the digests of known SPIT messages (step 428). If the message is identified as SPIT, then the method proceeds to step 416.

If the message is not identified as SPIT, however, the method continues by applying the near-duplicate matching module 120 to the message to further analyze the content of the message (step 432). Similar to the application of the digest module 112, the near-duplicate matching module 120 may be applied to the media portion of a message as opposed to the signaling portion of the message. The message may be filtered and analyzed by a number of different content filters 124, each designed to analyze a different feature of the message to determine if that particular feature exists in the SPIT feature database 308 or is similar to features of known SPIT messages. In the event the message is identified as SPIT, the method continues to step 416. If, on the other hand, the message passes the third test offered by the near-duplicate matching module, then the message is passed through the system 100 and allowed to continue to the identified recipient in the normal fashion (step 440). This step may further include notifying the identified recipient that a message is waiting on a voicemail server or allowing a real-time call to be forwarded to the identified recipient.

Figure 5:
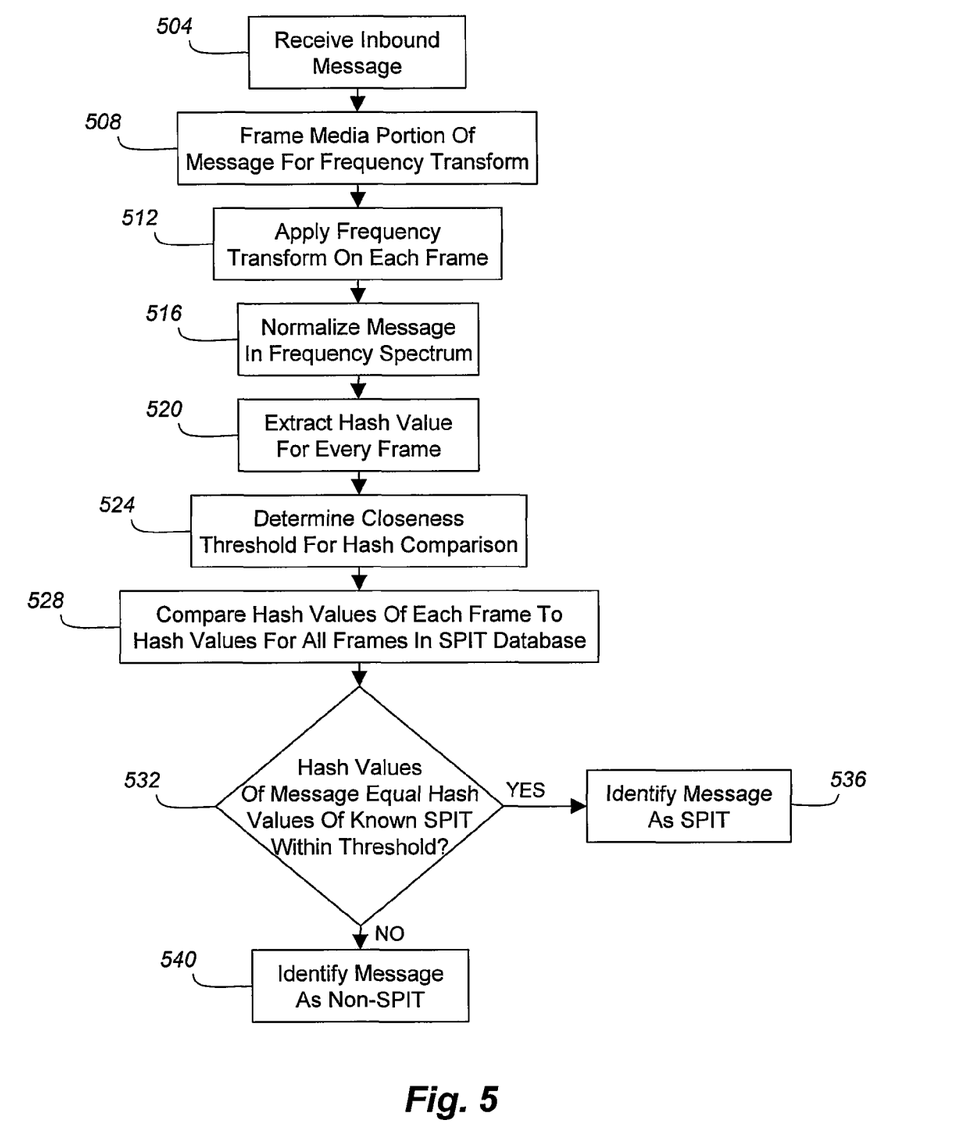
FIG. 5 is a flow diagram depicting a method of detecting SPIT messages with a digest algorithm in accordance with embodiments of the present invention.

Referring to FIG. 5, the operation of the digest algorithm 112 will be described in further detail in accordance with at least some embodiments of the present invention. The method begins when an inbound message is received at the digest algorithm 112 (step 504). When the message is received the media portion of the message is divided into a number of sections and framed for frequency transformation (step 508). The type of framing applied to each portion of the message may comprise a Hamming window with an overlap factor of 31/32. In other words, sections of a predetermined size may have a Hamming window applied thereto, where the sections have some amount of overlap or commonality with adjacent sections. Other types of windows which may be applied in this step include, but are not limited to, a simple rectangular or boxcar, triangular, flat top, sine, exponential, Tukey, Blackman, Bartlett, Kaiser, Nutall, Bessel, Blackman-Harris, Blackmann-Nutall, Bartlett-Hann, Kaiser-Bessel, Hanning, and Gaussian windows. The sizes of the windows may vary depending upon the size of hash that is desired. If a larger bit hash is desired, then portions of a larger size may be framed. Whereas if a smaller bit hash is desired, then the message may be divided into smaller portions for framing. In accordance with at least some embodiments, the message may be divided and framed into portions of 0.4 seconds in length. The shape of the window used may vary depending upon the amount of resolution desired for the digest.

After the message has been adequately framed, the method continues with the digest algorithm 112 applying a frequency transform on each frame (step 512). The transformation function applied to each frame may comprise a Discrete Fourier Transform, a Discrete-Time Fourier Transform, a Continuous Fourier Transform, a Fast Fourier Transform, or any other type of known transformation function. Many important audio features (i.e., tones) reside in the frequency domain. Therefore, a spectral representation of every frame of the message is useful in representing the actual content of the message.

Due to the sensitivity of the phase of the Fourier transform to different frame boundaries and the fact that the Human Auditory System (HAS) is relatively insensitive to phase, only the absolute value of the spectrum is needed. With the various portions of the message now in the frequency domain, the portions are normalized by the normalization operation 212 (step 516). In accordance with at least some embodiments of the present invention, the portions of the message are normalized in the frequency domain by taking the absolute value of message in the frequency domain so that only the magnitude of the message in the frequency domain is analyzed.

After each frame has been normalized, the method continues by extracting hash values for every frame (step 520). The extracted hash values are preferably 32-bit string hashes that robustly represent their corresponding frame. Of course, other sizes of digests or hash values may be determined for the message. The size of the hash, however, is typically determined by the size of the frame used in step 508. For every frame, 33 non-overlapping frequency bands may be selected. These bands may lie in the range from 300 Hz to 3000 Hz (the most relevant frequency range to auditory sound) and have a logarithmic spacing. The logarithmic spacing may be chosen because it is known that the HAS also operates on approximately logarithmic bands, also known as the Bark scale. In accordance with at least one embodiment of the present invention, the first band starts at 300 Hz and every band has a bandwidth of one musical tone (i.e., the bandwidth increases by a factor of $2(1/12)$ per band). The sign of the energy differences (simultaneously along the time and frequency axes) is a property that is very robust to many kinds of processing and therefore allows for more accurate comparisons of hash values.

When the hash value for each frame has been derived, a closeness threshold is determined for the hash comparison (step 524). The threshold may be adjusted based on the number of false positives/negatives that are tolerated in the system 100. If a relatively high number of false positive SPIT identifications are tolerated, then a larger threshold may be used. If a relatively low number of false positive SPIT identifications are tolerated, then a smaller threshold may be used. The threshold may be defined in terms of Bit Error Rate (BER) or number of bit differences per total number of bits in a hash. The BER between an incoming message and a known SPIT message may be about 0.115 to identify the incoming message as SPIT. In other words, a closeness threshold of 0.115 may be used to determine whether a particular hash is the same as a hash already identified in a SPIT message. Additionally, a closeness threshold may be defined in terms of the number of hashes in the incoming message that have been identified as being similar to a SPIT hash. For example, if an incoming message has 90% of its hash values identified as similar to some known SPIT hash, then that message may be identified as SPIT. Alternatively, if an incoming message only has 12% of its hash values identified as similar to some known SPIT hash value, then that message may not be identified as SPIT. Still another consideration in the closeness threshold may be whether the similar SPIT hashes all came from the same known SPIT message or whether they came from different known SPIT messages. If all of the similar hashes originate from the same one or two known SPIT messages, then the incoming message may be identified as SPIT, whereas if the similar hashes come from a large number of different known SPIT messages, then the message may not be identified as SPIT.

After the closeness threshold has been determined based on any of the above-described considerations, the method continues with the digest module 112 comparing all of the hashes of the incoming message with all of the hashes derived from all of the messages in the SPIT database 116 (step 528). Based on this comparison, the digest module 112 determines whether the hash values of the incoming message equal the hash values of known SPIT messages within the defined threshold (step 532). If the incoming message is substantially similar (e.g., based on the closeness threshold and the comparison of hash values) to one or more known SPIT messages, then the message is identified as SPIT (step 536). This positive determination may be made if all of the closeness threshold considerations (e.g., BER, percentage of hashes in the incoming message similar to a known SPIT hash, number of SPIT messages with similar hashes to the hashes of the incoming message, etc.) are met. It should be noted that each of these threshold considerations may be weighted as another consideration to further determine if the incoming message is SPIT. For example, if two of the three threshold considerations are met, then a message may be identified as SPIT, whereas if only one of three threshold considerations are met, then a message may not be identified as SPIT. If the closeness threshold considerations are not met, then the message may not be identified as SPIT (step 540).

Figure 6:
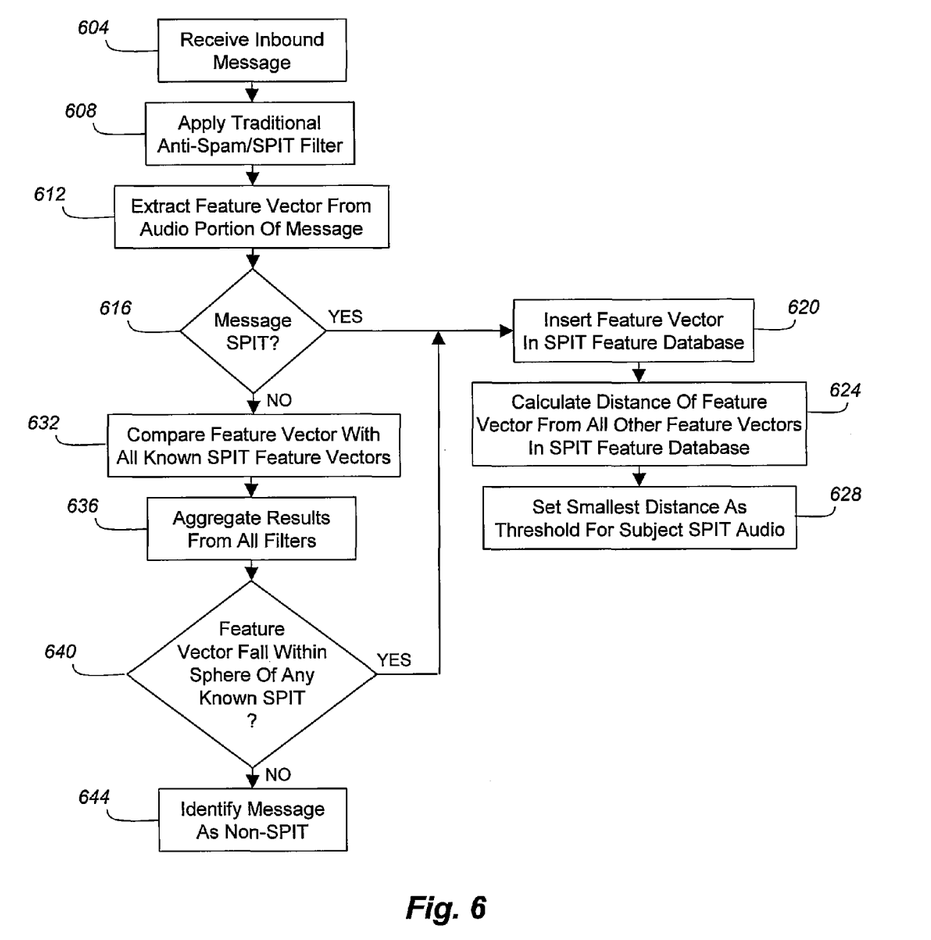
FIG. 6 is a flow diagram depicting a method of detecting SPIT messages with near-duplicate detection in accordance with embodiments of the present invention.

Referring now to FIG. 6, the operation of the near-duplicate matching module 120 will be described in further detail in accordance with at least some embodiments of the present invention. The method begins when an inbound message is received at the SPIT detection and filtration system 100 (step 604). When the message is received the content filter 124 continues by first applying a traditional anti-spam/SPIT filter 104 to the message (step 608). After the traditional anti-spam/SPIT filter 104 has been applied to the incoming message, feature vectors from the media/audio portion of the message may be extracted (step 612). The extracted features may vary depending upon the content filter 124 used to process the message. The number of features extracted from the message typically equals the number of content filters 124 in the near-duplicate matching module 120. The features are extracted after application of the traditional anti-spam/SPIT filter 104 because if the message is identified as SPIT by the traditional mechanisms, then the extracted feature(s) will be used to update the SPIT feature database 308. Alternatively, if the message is not initially identified as SPIT, then the extracted features will be further analyzed by the near-duplicate monitoring module 120.

Once the features have been extracted, it is determined whether the message is SPIT based on the application of the traditional filters 104 (step 616). If the message is identified as SPIT, then the extracted feature vectors are inserted in the SPIT feature database 308 (step 620). After the feature vectors from the incoming message have been inserted in the SPIT feature database 308, the method continues by calculating the distance of the feature vectors from all other corresponding feature vectors in the SPIT feature database 308 (step 624). This step may be applied on a per content filter 124 basis. The smallest distance between feature vectors in the SPIT feature database 308 is then set as the threshold that will be used to identify later received SPIT (step 628). This step trains the SPIT detection unit 312 and increases the coverage of the SPIT feature database 308 for each filter 124. As more and more SPIT messages are identified, the feature vector space becomes larger and more complete helping to later identify SPIT messages. A number of different factors may be considered while training the near-duplication matching module 120. For example, known normal messages (i.e., non-SPIT messages) may be used as a reference to calculate smallest distances. Alternatively, if it is too computationally costly to compare a particular message with all known spam messages one-by-one, as is usually the case in a very large spam database, then feature vectors of known spam messages may be "clustered" first based on their proximity to one another in the feature vector space, then the incoming message may be compared with the cluster heads (e.g., the average value of the feature vectors of all messages contained in the cluster). Different feature selections may also be employed, such as MCFF, LSP, etc. Different features might work better with different distance calculations. The fussing evaluator 128 may be adapted to combine different outcomes from each of these possible considerations.

Referring back to step 616, if the message is not initially identified as SPIT, then the method continues with each content filter 124 employing the SPIT detection unit 312 to compare the feature vector with all known SPIT feature vectors in the corresponding SPIT feature database 308 (step 632). This step differs from step 612 in that the SPIT detection unit is now analyzing the content of the message by focusing on the extracted feature rather than focusing on other signaling characteristics of the message. Once the extracted features have been compared with the feature vector space in the corresponding SPIT feature database 308, the results of the feature comparison for each content filter 124 is forwarded to the fussing evaluator 128 (step 636). The fussing evaluator 128 may be adapted to aggregate the results of all feature vector comparisons to determine if the message is a near-duplicate to a known SPIT message. The results of the comparisons may be aggregated in a number of different ways. For example, the results may be aggregated in an "AND" fashion, such that each content filter 124 is required to positively identify a message as SPIT based on the extracted feature. Alternatively, the results may be aggregated in an "OR" fashion, such that only one of the feature vectors have to be identified as corresponding to known SPIT feature vectors to positively identify the message as SPIT. Another aggregation technique that may be employed is a "VOTE" method where a selected number of the feature vectors have to be identified as corresponding to known SPIT feature vectors to positively identify the message as SPIT.

Based on the aggregation method, the fussing evaluator 128 determines whether the required number of extracted feature vectors fall within the sphere of any known SPIT (step 640). If less than the required number of extracted feature vectors are identified as related to a SPIT feature vector, then the message is not identified as SPIT (step 644). If this requirement is met, on the other hand, then the method returns to step 620 where the content filters 124 corresponding to the features positively identified as SPIT are trained with the feature vectors extracted from the recently received message.

Although the above-described embodiments of a multiple-level SPIT detection and removal system 100 show the multiple levels being in series (i.e., one level of SPIT detection is applied before another level of SPIT detection), one skilled in the art will appreciate that the various SPIT detection methods described herein may be applied in parallel to an incoming message with an evaluation of the results occurring at the conclusion of the application of the detection methods. As an example, an incoming message may be passed through a traditional anti-spam/SPIT filter 104, a digest module 112, and a near-duplicate matching module 120 at substantially the same time, then if any one of the filtering methods identifies the incoming message to be SPIT, then further mitigation actions can be taken.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for detecting and diverting unwanted electronic messages, such as voice messages. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:
1. A method for filtering unsolicited calls, comprising:
receiving a message addressed to an intended recipient;
extracting, by a microprocessor, a plurality of feature vectors from content of the message, each of the plurality of feature vectors describing message content, wherein at least two of the plurality of feature vectors comprise different threshold distances;
incorporating each of the extracted plurality of feature vectors into feature vectors from content of previously identified spam messages;
calculating a first distance from a first of the plurality of feature vectors to each feature vector in an associated spam feature database;
identifying a first feature vector in the associated spam feature database that is closest to the first of the plurality of feature vectors;
determining the first distance to be a distance from the first identified feature vector to the first of the plurality of feature vectors;
setting the first distance as a first threshold associated with the first of the plurality of feature vectors for determining that other features vectors are similar to the first of the plurality of feature vectors;
calculating a second distance from a second of the plurality of feature vectors to each feature vector in the associated spam feature database;
identifying a second feature vector in the associated spam feature database that is closest to the second of the plurality of feature vectors;
determining the second distance to be a distance from the second identified feature vector to the second of the plurality of feature vectors; and
setting the second distance as a second threshold associated with the second of the plurality of feature vectors for determining that other features vectors are similar to the second of the plurality of feature vectors, wherein the first and second thresholds are different;
comparing, by the microprocessor, the extracted plurality of feature vectors to the feature vectors from the content of the previously identified spam messages;
determining, by the microprocessor, whether each of the extracted plurality of feature vectors are within a threshold distance from at least one spam feature vector; and
applying, by the microprocessor, following rules to results of the determining step:
(i) in an event that each of the extracted plurality of feature vectors are within the threshold distance from at least one spam feature vector, adding the message to a list of previously identified spam messages; and
(ii) in an event that the plurality of feature vectors are not within the threshold distance from at least one spam feature vector, allowing the message to be forwarded to the intended recipient.
2. The method of claim 1, wherein rule (i) applies, the method further comprising indicating to the intended recipient that the received message has been identified as spam, wherein the indicating step comprises at least one of the following (a) deleting the message, (b) notifying the intended recipient that the message has been identified as spam, (c) restricting the message from being forwarded to the intended recipient, and (d) adding the message to a spam message repository and then notifying the intended recipient that the message is stored in the spam message repository.

3. The method of claim 1, further comprising:
aggregating results of the comparison of each of the plurality of feature vectors to determine whether the message is a near-duplicate of a previously identified spam message, wherein the message is a near-duplicate of a previously identified spam message when audio content of the message is perceptually similar to audio content of the previously identified spam message.

4. The method of claim 1, further comprising:
creating a digest from content of the message;
comparing the digest of the message to digests from content of previously identified spam messages;
determining whether the digest of the message is equal to a digest of a previously identified spam message within a predetermined threshold; and
performing one of the following:
  (i) in an event that the digest of the message is equal to the digest of a previously identified spam message within a predetermined threshold, adding the message to the list of previously identified spam messages; and
  (ii) in an event that the digest of the message is not equal to the digest of a previously identified spam message within a predetermined threshold, allowing the message to be forwarded to the intended recipient.

5. The method of claim 4, wherein creating a digest from content of the message comprises generating a robust hash of the audio content of the message.

6. The method of claim 5, wherein creating a digest comprises:
dividing the audio content of the message into audio segments of predetermined length;
framing each audio segment;
applying a frequency transform function to each framed audio segment;
selecting frequency bands; and
extracting a plurality of hashes based on the selected frequency bands, wherein the hashes each represent a portion of the audio content of the message in the frequency domain.

7. A non-transitory computer readable medium comprising processor executable instructions configured to perform the method of claim 1.

8. A system for filtering unsolicited calls, comprising:
memory including instructions and a microprocessor configured to execute the instructions stored in memory, the instructions when executed by the microprocessor:
receiving a message addressed to an intended recipient;
extracting, a plurality of feature vectors from content of the message, each of the plurality of feature vectors describing message content, wherein at least two of the plurality of feature vectors comprise different threshold distances; incorporating each of the extracted plurality of feature vectors into feature vectors from content of previously identified spam messages, calculating a first distance from a first of the plurality of feature vectors to each feature vector in an associated spam feature database, identifying a first feature vector in the associated spam feature database that is closest to the first of the plurality of feature vectors, determining the first distance to be a distance from the first identified feature vector to the first of the plurality of feature vectors, setting the first distance as a first threshold associated with the first of the plurality of feature vectors for determining that other features vectors are similar to the first of the plurality of feature vectors, calculating a second distance from a second of the plurality of feature vectors to each feature vector in the associated spam feature database, identifying a second feature vector in the associated spam feature database that is closest to the second of the plurality of feature vectors, determining the second distance to be a distance from the second identified feature vector to the second of the plurality of feature vectors, and setting the second distance as a second threshold associated with the second of the plurality of feature vectors for determining that other features vectors are similar to the second of the plurality of feature vectors, wherein the first and second thresholds are different; comparing, the extracted plurality of feature vectors to the feature vectors from the content of the previously identified spam messages; determining whether each of the extracted plurality of feature vectors are within a threshold distance from at least one spam feature vector; and applying following rules:
  (i) in an event that each of the extracted plurality of feature vectors are within the threshold distance from at least one spam feature vector, adding the message to a list of previously identified spam messages; and
  (ii) in an event that the plurality of feature vectors are not within the threshold distance from at least one spam feature vector, allowing the message to be forwarded to the intended recipient.

9. The system of claim 8, wherein the first threshold and second threshold are further defined by bit error rate.

10. The system of claim 8, comprising additional instructions when executed by the microprocessor: providing an indication that the extracted at least one feature vector is within the threshold distance from the at least one feature vector identified as spam.

11. The system of claim 8, comprising additional instructions when executed by the microprocessor: extracting and examining different feature vectors from the content of the message, and aggregating results to determine whether the received message comprises spam, and wherein the results are aggregated according to at least one of an AND, OR, and VOTE fashion.

12. The system of claim 8, further comprising additional instructions when executed by the microprocessor: create creating a digest from the content of the message, compare the digest of the content of the message to digests from the content of previously identified spam messages, and determine whether the digest of the content of the message is equal to one of the digests of the content of the previously identified spam messages within a predetermined threshold.

13. The system of claim 12, further comprising additional instructions when executed by the microprocessor:
creating the digest from the content of the message by dividing the message into segments of predetermined length, framing each segment, applying a frequency transform function to each framed segment, selecting frequency bands, and extracting a plurality of hashes based on the selected frequency bands, wherein the hashes each represent a portion of the content of the message in a frequency domain, and adding the message to the list of previously identified spam messages in an event that the digest of the content of the message equal to one of the digests of the content of the previously identified spam messages within a predetermined threshold.

14. The system of claim 13, wherein the predetermined threshold is defined by at least one of the following parameters: (i) bit error rate; (ii) percentage of hashes in the incoming message equal to a known spam hash within a predetermined threshold; and (iii) number of spam messages with hashes equal to the hashes of the incoming message within a predetermined threshold.

15. The system of claim 12, further comprising additional instructions when executed by the microprocessor: removing noise from the message.

16. The system of claim 8, wherein the message is stored for retrieval on a server and further comprising additional instructions when executed by the microprocessor: analyzing and deleting the message on the server.

17. The system of claim 8, wherein the message is a real-time communication and further comprising additional instructions when executed by the microprocessor: analyzing a media channel carrying the content of the message.

* * * * *

UNITED STATES PATENT AND TRADEMARK OFFICE
CERTIFICATE OF CORRECTION

| | | |
|---|---|---|
| PATENT NO. | : 8,141,152 B1 | Page 1 of 1 |
| APPLICATION NO. | : 11/958729 | |
| DATED | : March 20, 2012 | |
| INVENTOR(S) | : Lin Yuh-Hwang, Leroy Lacy and Li Ling | |

It is certified that error appears in the above-identified patent and that said Letters Patent is hereby corrected as shown below:

At Column 18, line 40, delete the word "create" therein.

Signed and Sealed this
Eighteenth Day of December, 2012

David J. Kappos
*Director of the United States Patent and Trademark Office*